US009641974B2

(12) United States Patent
Gao et al.

(10) Patent No.: US 9,641,974 B2
(45) Date of Patent: May 2, 2017

(54) TECHNIQUES FOR DETERMINING A POSITION FIX OF AN OBJECT USING ONE OR MORE MOBILE DEVICES CO-LOCATED WITH THE OBJECT

(71) Applicant: QUALCOMM Incorporated, San Diego, CA (US)

(72) Inventors: Weihua Gao, San Jose, CA (US); Sai Pradeep Venkatraman, Santa Clara, CA (US); Benjamin A. Werner, San Carlos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 14/566,552

(22) Filed: Dec. 10, 2014

(65) Prior Publication Data

US 2016/0174034 A1    Jun. 16, 2016

(51) Int. Cl.
| | | |
|---|---|---|
| *H04W 24/00* | (2009.01) | |
| *H04W 4/02* | (2009.01) | |
| *G01S 5/00* | (2006.01) | |
| *G01S 5/02* | (2010.01) | |
| *H04W 8/00* | (2009.01) | |
| *H04W 24/10* | (2009.01) | |

(52) U.S. Cl.
CPC ........... *H04W 4/023* (2013.01); *G01S 5/0072* (2013.01); *G01S 5/0257* (2013.01); *H04W 8/005* (2013.01); *H04W 24/10* (2013.01)

(58) Field of Classification Search
USPC ...................................................... 455/456.2
See application file for complete search history.

(56) References Cited

U.S. PATENT DOCUMENTS

| | | | |
|---|---|---|---|
| 6,968,194 | B2 | 11/2005 | Aljadeff et al. |
| 8,320,877 | B2 | 11/2012 | Hansen et al. |
| 9,213,081 | B2 | 12/2015 | Tarlow et al. |
| 2004/0137915 | A1 | 7/2004 | Diener et al. |
| 2011/0291882 | A1 | 12/2011 | Walsh et al. |

FOREIGN PATENT DOCUMENTS

| | | |
|---|---|---|
| WO | WO-2004008171 A1 | 1/2004 |
| WO | WO-2009100013 A2 | 8/2009 |
| WO | WO-2014116885 A2 | 7/2014 |

OTHER PUBLICATIONS

International Search Report and Written Opinion—PCT/US2015/057412—ISA/EPO—Jan. 28, 2016.
Santhapuri N., et al., "Sensor Assisted Wireless Communication," 17th IEEE Workshop on Local and Metropolitan Area Networks (LANMAN), 2010, pp. 1-5.

*Primary Examiner* — Joel Ajayi
(74) *Attorney, Agent, or Firm* — Berkeley Law & Technology Group, LLP

(57) ABSTRACT

Disclosed are devices, systems and methods for combining observations obtained at two different mobile devices attached to a human user for performing a navigation operation. For example, observations of a signal acquired at a first mobile device may be selected for computing a position fix based, at least in part, on a utility indicator associated with the observations.

14 Claims, 5 Drawing Sheets

TECHNIQUES FOR DETERMINING A POSITION FIX OF AN OBJECT USING ONE OR MORE MOBILE DEVICES CO-LOCATED WITH THE OBJECT

BACKGROUND

1. Field

The subject matter disclosed herein relates to electronic devices, and more particularly to methods, apparatuses and articles of manufacture for use by and/or in a first mobile device to determine a position fix of an object co-located with the first mobile device and at least one other mobile device.

2. Information

As its name implies, a mobile device may be moved about, e.g. typically being carried by or otherwise co-located in some manner with an object, such as, e.g., a person, an animal, a machine, etc. By way of some non-limiting examples, a mobile device may take the form of a cellular telephone, a smart phone, a tablet computer, a laptop computer, a wearable computer, a navigation and/or tracking device, etc.

Certain mobile devices may be enabled to provide, support, and/or otherwise make use of certain wireless signal based positioning techniques/services, e.g., applying various satellite positioning system (SPS) technologies, various cellular technologies, various wireless indoor positioning technologies, and/or the like or some combination thereof. In certain instances, a mobile device may be provided with positioning assistance data that may enable the mobile device to estimate its location (e.g., with regard to a map, etc.) using one or more positioning techniques or technologies. As such, a mobile device that may be co-located with an object may be able to indicate, at least in part, a reasonable position and/or other like information regarding the movement or positioning of the object. However, in certain instances, certain wireless signals used for positioning may become unavailable to a mobile device (e.g., due to attenuation, scattering, absorption, reflections, interference, etc.).

SUMMARY

Briefly, particular implementations are directed to a method comprising, at a first mobile device: detecting a presence of a second mobile device, the first mobile device and the second mobile device being located on different locations on a human body; acquiring by said first mobile device a first signal from a first fixed transmitter device to obtain one or more first observations of said first signal; acquiring by said first mobile device a second signal from a second fixed transmitter device to obtain one or more first observations of said second signal; receiving one or more messages from the second mobile device comprising one or more second observations of the first signal transmitted from the first fixed transmitter device, wherein the one or more second observations of the first signal transmitted by the first fixed transmitter device are obtained by the second mobile device, and one or more second observations of the second signal from the second fixed transmitter, wherein the one or more second observations of the second signal transmitted by the second fixed transmitter device are obtained by the second mobile device; selecting at least one of the one or more first observations of said first signal for computing a position fix for said human body based at least in part, on a first indicator, the first indicator being indicative of a utility of the one or more first observations of said first signal relative to a second indicator, the second indicator being indicative of a utility of the one or more second observations of said first signal; and selecting at least one of the one or more second observations of said second signal for computing said position fix for said human body based at least in part, on a third indicator, the third indicator being indicative of a utility of the one or more first observations of said second signal relative to a fourth indicator, the fourth indicator being indicative of a utility of the one or more second observations of said second signal.

Another particular implementation is directed to a first mobile device comprising: a transceiver device for transmitting messages to and receiving messages from a wireless communication network; and one or more processors to: detect a presence of a second mobile device, said first mobile device and said second mobile device being located on different locations on a human body; obtain one or more observations of a first signal transmitted by a first fixed transmitter device and acquired at said transceiver device; obtain one or more observations of a second signal transmitted from a second fixed transmitter device and acquired at said transceiver device; obtain, from one or more messages received at the transceiver device from the second mobile device, one or more second observations of the first signal transmitted from the first fixed transmitter device, wherein the one or more second observations of the first signal transmitted by the first fixed transmitter device are obtained by the second mobile device, and one or more second observations of the second signal from the second fixed transmitter, wherein the one or more second observations of the second signal transmitted by the second fixed transmitter device are obtained by the second mobile device; select at least one of the one or more first observations of said first signal for computing a position fix for said human body based at least in part, on a first indicator, the first indicator being indicative of a utility of the one or more first observations of said first signal relative to a second indicator, the second indicator being indicative of a utility of the one or more second observations of said first signal; and select at least one of the one or more second observations of said second signal for computing said position fix for said human body based at least in part, on a third indicator, the third indicator being indicative of a utility of the one or more first observations of said second signal relative to a fourth indicator, the fourth indicator being indicative of a utility of the one or more second observations of said second signal.

Another particular implementation is directed to a non-transitory storage medium comprising machine-readable instructions stored thereon which are executable by one or more processors of a first mobile device to: detect a presence of a second mobile device, said first mobile device and said second mobile device being located on different locations on a human body; obtain one or more observations of a first signal transmitted by a first fixed transmitter device and acquired at said first mobile device; obtain one or more observations of a second signal transmitted from a second fixed transmitter device and acquired at said first mobile device; obtain, from one or more messages received at the first mobile device from the second mobile device, one or more second observations of the first signal transmitted from the first fixed transmitter device, wherein the one or more second observations of the first signal transmitted by the first fixed transmitter device are obtained by the second mobile device, and one or more second observations of the second signal from the second fixed transmitter, wherein the one or more second observations of the second signal transmitted by the second fixed transmitter device are obtained by the second mobile device; select at least one of the one or more first observations of said first signal for computing a position fix for said human body based at least in part, on a first indicator, the first indicator being indicative of a utility of the one or more first observations of said first signal relative to a second indicator, the second indicator being indicative of a utility of the one or more second observations of said first signal; and select at least one of the one or more second observations of said second signal for computing said position fix for said human body based at least in part, on a third indicator, the third indicator being indicative of a utility of the one or more first observations of said second signal relative to a fourth indicator, the fourth indicator being indicative of a utility of the one or more second observations of said second signal.

Another particular implementation is directed to a first mobile device, comprising: means for detecting a presence of a second mobile device, said first mobile device and said second mobile device being located on different locations on a human body; means for acquiring by said first mobile device a first signal from a first fixed transmitter device to obtain one or more first observations of said first signal; means for acquiring by said first mobile device a second signal from a second fixed transmitter device to obtain one or more first observations of said second signal; means for receiving one or more messages from the second mobile device comprising one or more second observations of the first signal transmitted from the first fixed transmitter device, wherein the one or more second observations of the first signal transmitted by the first fixed transmitter device are obtained by the second mobile device, and one or more second observations of the second signal from the second fixed transmitter, wherein the one or more second observations of the second signal transmitted by the second fixed transmitter device are obtained by the second mobile device; means for selecting at least one of the one or more first observations of said first signal for computing a position fix for said human body based at least in part, on a first indicator, the first indicator being indicative of a utility of the one or more first observations of said first signal relative to a second indicator, the second indicator being indicative of a utility of the one or more second observations of said first signal; and means for selecting at least one of the one or more second observations of said second signal for computing said position fix for said human body based at least in part, on a third indicator, the third indicator being indicative of a utility of the one or more first observations of said second signal relative to a fourth indicator, the fourth indicator being indicative of a utility of the one or more second observations of said second signal.

Another particular implementation is directed to method comprising, at a first mobile device: identifying a presence of a second mobile device, the first mobile device and the second mobile device being co-located with an object; identifying a first operative condition of the first mobile device and a second operative condition of the second mobile device; and in response to a determination based, at least in part, on the first operative condition and the second operative condition, that only one of the first mobile device and the second mobile device is classified as being available for wireless signal based positioning: obtaining one or more positioning measurement values based, at least in part, on one or more wireless signals received by the one of the first mobile device and the second mobile device; and determining a position fix for the object based, at least in part, on the one or more positioning measurement values. In one example alternative, identifying the first operative condition and the second operative condition is based, at least in part, on an observed signaling condition corresponding to at least one of the first mobile device or the second mobile device. In another example alternative, identifying the first operative condition and the second operative condition is based, at least in part, on a sensed motion corresponding to at least one of the first mobile device or the second mobile device. In another example alternative, identifying the first operative condition and the second operative condition is based, at least in part, on a sensed proximity corresponding to at least one of the first mobile device or the second mobile device. In another example alternative, identifying the first operative condition and the second operative condition is based, at least in part, on a sensed light condition, a sensed sound condition, or a combination thereof, corresponding to at least one of the first mobile device or the second mobile device. In another example alternative, identifying the first operative condition and the second operative condition is based, at least in part, on a current operating mode corresponding to at least one of the first mobile device or the second mobile device. In another example alternative, identifying the first operative condition and the second operative condition is based, at least in part, on one or more user inputs corresponding to at least one of the first mobile device or the second mobile device. In another example alternative, at least one of the one or more positioning measurement values is based, at least in part, on at least one wireless signals previously received by the one of the first mobile device and the second mobile device. In another example alternative, obtaining the one or more positioning measurement values further comprises initiating a search by the one of the first mobile device and the second mobile device for at least one of the one or more wireless signals. In another example alternative, identifying the presence of a second mobile device further comprises: exchanging one or more signals over a wireless communication link, receiving one or more user inputs, receiving a signal from another device indicating the presence, or some combination thereof. In another example alternative, the method at the first mobile device may further comprise, in response to a determination based, at least in part, on the first operative condition, the second operative condition, or a combination thereof, that the second mobile device is classified as being unavailable for wireless signal based positioning, transmitting a signal to the second mobile device indicating approval for the second mobile device to change from a higher usage power state to a lower usage power state. In another example alternative, the method at the first mobile device may further comprise in response to a determination based, at least in part, on the first operative condition, the second operative condition, or a combination thereof, that the first mobile device is classified as being unavailable for wireless signal based positioning, transmitting a signal to the second mobile device indicating approval for the second mobile device to change from a lower usage power state to a higher usage power state. In another example alternative, the method at the first mobile device may further comprise subsequent to a determination based, at least in part, on the first operative condition, the second operative condition, or a combination thereof, that the second mobile device is classified as being unavailable for wireless signal based positioning, transmitting one or signals to the second mobile device indicative of updated wireless signal based positioning data. In another example alternative, the method at the first mobile device may further comprise, subsequent to a determination based, at least in part, on the first operative condition, the second operative condition, or a combination thereof, that the first mobile device is classified as being unavailable for wireless signal based positioning, receiving one or signals from the second mobile device indicative of updated wireless signal based positioning data. In another example alternative, the method at the first mobile device may further comprise in response to a determination based, at least in part, on the first operative condition and the second operative condition, that both of the first mobile device and the second mobile device are classified as being available for wireless signal based positioning: obtaining one or more first positioning measurement values based, at least in part, on one or more wireless signals received by the first mobile device, and one or more second positioning measurement values based, at least in part, on one or more wireless signals received by the second mobile device; and determining the position fix for the object based, at least in part, on at least one positioning measurement value selected from the one or more first positioning measurement values or the one or more second positioning measurement values. In another example alternative, the object comprises a person, and at least one of the first mobile device or the second mobile device comprises a wearable computing device.

Another particular implementation is directed to an apparatus for use in a first mobile device, the apparatus comprising: means for identifying a presence of a second mobile device, the first mobile device and the second mobile device being co-located with an object; means for identifying a first operative condition of the first mobile device; means for identifying a second operative condition of the second mobile device; and means for obtaining one or more positioning measurement values based, at least in part, on one or more wireless signals received by one of the first mobile device and the second mobile device, in response to a determination based, at least in part, on the first operative condition and the second operative condition, that only the one of the first mobile device and the second mobile device is classified as being available for wireless signal based positioning; and means for determining a position fix for the object based, at least in part, on the one or more positioning measurement values.

Another particular implementation is directed to a first mobile device comprising: a communication interface; and a processing unit to: identify a presence of a second mobile device, the first mobile device and the second mobile device being co-located with an object; identify a first operative condition of the first mobile device; identify a second operative condition of the second mobile device; and obtain one or more positioning measurement values via the communication interface, the one or more positioning measurement values being based, at least in part, on one or more wireless signals received by one of the first mobile device and the second mobile device, in response to a determination based, at least in part, on the first operative condition and the second operative condition, that only the one of the first mobile device and the second mobile device is classified as being available for wireless signal based positioning; and determine a position fix for the object based, at least in part, on the one or more positioning measurement values.

Another particular implementation is directed to a non-transitory computer readable medium having stored therein computer implementable instructions executable by a processing unit of a first mobile device to: identify a presence of a second mobile device, the first mobile device and the second mobile device being co-located with an object; identify a first operative condition of the first mobile device; identify a second operative condition of the second mobile device; and in response to a determination based, at least in part, on the first operative condition and the second operative condition, that only one of the first mobile device and the second mobile device is classified as being available for wireless signal based positioning: obtain one or more positioning measurement values based, at least in part, on one or more wireless signals received by the one of the first mobile device and the second mobile device; and determine a position fix for the object based, at least in part, on the one or more positioning measurement values. It should be understood that the aforementioned implementations are merely example implementations, and that claimed subject matter is not necessarily limited to any particular aspect of these example implementations.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
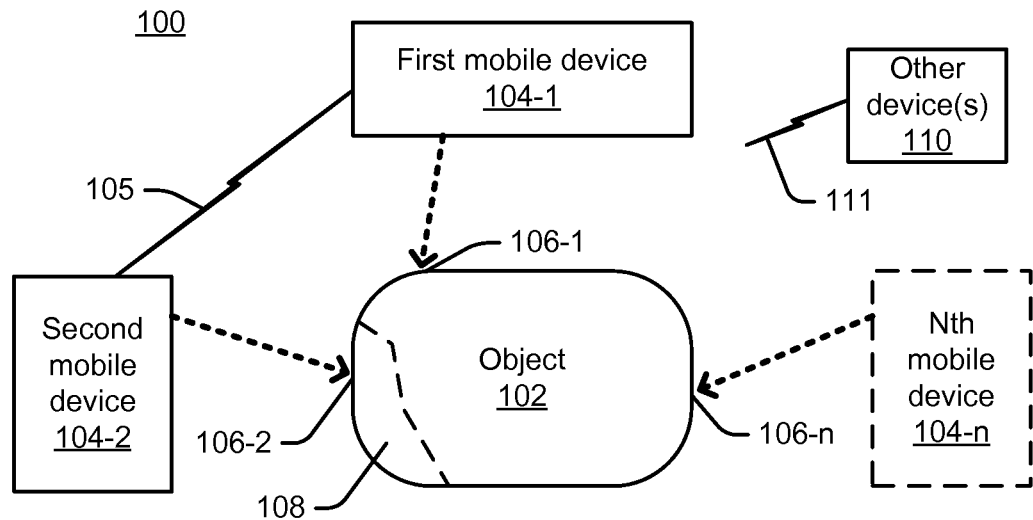
FIG. 1 is a schematic block diagram illustrating an example arrangement of representative electronic devices including an example first mobile device that may determine a position fix of an object co-located with the first mobile device and at least one other mobile device, in accordance with certain example implementations.

Various example techniques are provided herein which may be implemented at a mobile device to determine a position fix of an object co-located with the first mobile device and at least one other mobile device.

As may be appreciated, in certain instances a person holding or carrying a first mobile device such as a smartphone may also wear or carry a second mobile device such as a wearable computing device and/or the like, which may be attachable so as to be co-located with a particular point of the person. For example, a person may wear a smart watch on his/her wrist, in addition to carrying a smartphone in his/her pocket or purse, etc. In a particular implementation, a wireless communication link (e.g., Bluetooth, near field communication (NFC) link, and/or the like) may be established between the first mobile device (e.g., a hand held communication/computing device) and one or more other mobile devices, such as, e.g., a second mobile device possibly in the form of a wearable computing device. Such communication capabilities may, in certain instances, be used to exchange (e.g., transmitted and/or received) various signals (e.g., representing data, measurements, instructions, messages, etc.). In certain instances, one or more exchanged signals may be used to discover, verify and/or otherwise identify in some manner a presence, a capability, and/or other like information regarding one or more mobile devices that may be co-located with an object. In another example, certain exchanged signals may support techniques for coordinating the gathering, processing, storage, and/or the like of some combination thereof, of information that may be useful for positioning and navigation capabilities, e.g., relating to the object. Here, for example, it may be useful at times for wireless signal based positioning related measurements and/ or other like data and/or instructions to be shared between mobile devices, e.g., to possibly support various coordinated, collaborative, and/or other like processing schemes relating to the object in some manner.

While various example types of mobile devices are illustrated herein by way of example, it should be kept in mind that the various example techniques provided herein may be applied to a wide variety of mobile devices that may be co-located with an object. Moreover, claimed subject matter is not intended to necessarily be limited by any of these examples.

In accordance with certain example implementations, a first mobile device may identify a presence of one or more other mobile devices (e.g., a second mobile device, etc.). Several examples are provided in greater detail herein illustrating various techniques by which a mobile device may identify a presence of one or more other devices. A first mobile device may, for example, identify a presence of another mobile device (e.g., a second mobile device) based, at least in part, on one or more signals (e.g., possibly an exchange of one or more signals over a wireless communication link with the second mobile device as previously mentioned), receiving one or more user inputs, receiving one or more signals from one or more other devices (e.g., a server, etc.) indicating such a presence, and/or other like techniques or some combination thereof.

With this in mind, a first mobile device may, for example, identify a presence of another mobile device (e.g., a second mobile device) based, at least in part, on a decision that the first mobile device and the second mobile device are co-located with an object. By way of an initial example, in certain instances an object may comprise a person, a first mobile device may comprise a smartphone or the like, and a second mobile device may comprise a smart watch or the like, etc., each of which may each be carried in some manner by a person. For example, a smartphone or the like may be held in a person's hand at times, while placed in a holder, a pocket, a purse, a satchel, a backpack, etc., at other times. For example, a smart watch or the like may, at times, be fixed around a person's wrist, arm, ankle, etc., or possibly worn on their head (e.g., possibly in some form of a headband, a hat, glasses, headphones, etc.) or perhaps provided as part of some particular clothing, jewelry, etc., that may be worn at times by a person. Of course, at times such a smart watch or the like may be placed in a holder, a pocket, a purse, a satchel, a backpack, etc. In other example implementations, an object may comprise an animal or a machine, which may "carry" two or more mobile devices co-located with the object.

In certain example implementations, a first mobile device may further identify an operative condition of one or more of the mobile devices co-located with an object. For example, a first operative condition may be identified for the first mobile device, and a second operative condition may be identified for a second mobile device. An operative condition of a mobile device may, for example, be indicative, at least in part, as to whether the mobile device may be classified as being "available" (or conversely/alternatively being classified as being "unavailable") for wireless signal based positioning. For brevity, the terms "potentially available" and "potentially unavailable" are used herein as representing two example classifications regarding a mobile device.

By way of an example, in certain instances, an operative condition of a mobile device may be based, at least in part, on a signaling condition observed by the mobile device. Here, for example, an observed change in a signal strength, phase, time of travel, and/or other measurement(s) for one or more wireless signals may indicate that a mobile device may be more or less likely to be "available" for wireless signal based positioning. Thus, for example, if a signal strength measurement decreases, as might occur due to signal attenuation/interference (e.g., when a mobile device is moved from a person's hand to inside a backpack, etc.), such a mobile device may in certain instances be considered less likely available and perhaps even unavailable for wireless signal based positioning. In a reversed example, if a signal strength measurement increases, as might occur due to reduced signal attenuation/interference (e.g., when a mobile device is moved from inside a person's backpack, etc., to their hand), such a mobile device may in certain instances be considered more likely available for wireless signal based positioning.

By way of an example, in certain instances, an operative condition of a mobile device may be based, at least in part, on a motion (e.g., inertial) sensed by the mobile device. Here, for example, one or more sensed motions may indicate that a mobile device may be more or less likely to be "available" for wireless signal based positioning. For example, if a sensed motion (e.g., based on one or more electrical signals from an accelerometer, a gyroscope, a magnetometer, etc.) of a smartphone or the like indicates that the smartphone is moving in accordance with some model of object movement, then an inference may be made that the smartphone may be located at or near a particular point of the object (here, e.g., a person). For example, a pedestrian model may correspond to a person walking. Thus, if the person is carrying a smartphone in a pocket of their clothing, within a backpack, etc., as they walk, smartphone may sense motion that corresponds to such a motion model. In certain instances, a mobile device that is being carried within a pocket, backpack, etc., may be considered less likely available and perhaps even unavailable for wireless signal based positioning (e.g., due to a relatively higher level of signal attenuation/interference, etc.). Conversely, in some instances, motion sensed by a mobile device that is being carried in the open (e.g., in a person's hand, attached to a wrist or arm, etc.) may be considered more likely available for wireless signal based positioning (e.g., due to relatively lower signal attenuation/interference, etc.).

By way of an example, in certain instances, an operative condition of a mobile device may be based, at least in part, on a sensed proximity of the mobile device to some surface/ matter, e.g., as may be indicated by one or more proximity sensors of the mobile device. The presence or absence of a sensed proximity may, for example, indicate, at least in part, that a mobile device may be more or less likely to be "available" for wireless signal based positioning. For example, if a sensed proximity of a smartphone or the like indicates that the smartphone may be adjacent to or nearby some form of surface/matter (e.g., as may be the situation when the smartphone is carried in a pocket, a backpack, etc., the smartphone may be considered less likely available and perhaps even unavailable for wireless signal based positioning (e.g., again due to a relatively higher level of signal attenuation/interference, etc.). Conversely, in some instances, if there is an absence of a sensed proximity (e.g., at least part of the smartphone may be open to the environment, perhaps being carried in a person's hand), then the smartphone may be considered more likely available for wireless signal based positioning.

In another example, in certain instances, an operative condition of a mobile device may be based, at least in part, on a light condition sensed by one or more sensors, cameras, and/or the like of the mobile device. The presence, absence, or some other corresponding measurement of a sensed light condition may, for example, indicate, at least in part, that a mobile device may be more or less likely to be "available" for wireless signal based positioning. For example, certain sensed light conditions may indicate that the smartphone may be in a pocket, a backpack, etc., and thus the smartphone may be considered less likely available and perhaps even unavailable for wireless signal based positioning (e.g., again due to a relatively higher level of signal attenuation/interference, etc.). Conversely, in some instances, certain other sensed light conditions may indicate that at least part of the smartphone may be open to the environment (e.g., perhaps being carried in a person's hand), and thus the smartphone may be considered more likely available for wireless signal based positioning.

In some instances, an operative condition of a mobile device may, for example, be based, at least in part, on a sound condition sensed by one or more sensors, microphones, and/or the like of the mobile device. The presence, absence, or some other corresponding measurement of a sensed sound condition may, for example, indicate, at least in part, that a mobile device may be more or less likely to be "available" for wireless signal based positioning. For example, certain sensed sound conditions may indicate that the smartphone may be in a pocket, a backpack, etc., and thus the smartphone may be considered less likely available and perhaps even unavailable for wireless signal based positioning (e.g., again due to a relatively higher level of signal attenuation/interference, etc.). Conversely, in some instances, certain other sensed sound conditions may indicate that at least part of the smartphone may be open to the environment (e.g., perhaps being carried in a person's hand), and thus the smartphone may be considered more likely available for wireless signal based positioning.

In still other example implementations, an operative condition of a mobile device may be based, at least in part, on one or more operating modes and/or the like of the mobile device. For example, a current operating mode of the mobile device corresponding to certain functions/capabilities may indicate, at least in part, that a mobile device may be more or less likely to be "available" for wireless signal based positioning. Thus, for example, if a current operating mode likely makes use of a user input device and/or user output device (e.g., a display, a touchscreen, a speaker, a microphone, a camera, a projector, etc., and/or some other input/output device (e.g., a wired interface, a wireless interface, etc.) of a smartphone or the like, then such operating mode(s) may indicate that the smartphone may not be in a pocket, a backpack, etc., but rather in a person's hand or in some other manner in a position for use rather than storage; and, hence, such a smartphone may be considered more likely available for wireless signal based positioning. Conversely, in some instances, certain other operating modes may indicate that such a smartphone may not be open to the environment or in some position for use, but rather in storage (e.g., perhaps being carried in a purse, etc.), and thus the smartphone may be considered less likely available for wireless signal based positioning (e.g., due to a relatively higher level of signal attenuation/interference, etc.).

In some instances, an operative condition of a mobile device may be based, at least in part, on one or more user inputs received by the mobile device. For example, the presence or absence of user input(s) may indicate, at least in part, that a mobile device may be more or less likely to be "available" for wireless signal based positioning. For example, receiving user input(s) (e.g., via a keypad, a button, a switch, a touchscreen, a microphone, a camera, etc.), and/or via some other input/output device (e.g., a Bluetooth or other like wireless interface, etc.) of a smartphone or the like, may indicate that the smartphone may not be in a pocket, a backpack, etc., but rather in a person's hand or in some other manner in a position for use rather than storage; and, hence, such a smartphone may be considered more likely available for wireless signal based positioning. Alternatively, in some instances, a lack of user input(s) may indicate that such a smartphone may not be open to the environment or in some position for use, but rather in storage (e.g., perhaps being carried in a holder, etc.), and thus the smartphone may be considered less likely available for wireless signal based positioning (e.g., due to a relatively higher level of signal attenuation/interference, etc.).

The examples provided herein, and particularly above, are intended to represent just a few examples of operative conditions that may be identified. Furthermore, it should be understood that different mobile devices may have different operative conditions. Also, it should be understood that, in certain instances, an operative condition may be independently identified by a corresponding mobile device and possibly shared with other devices. For example, a second mobile device may identify one or more operative conditions and transmit such information to a first mobile device, and/or possibly some other device (e.g., a server, etc.). In certain other example implementations, an operative condition for a particular mobile device may be identified by another device, e.g., based, at least in part, on applicable information regarding and/or from the particular mobile device. For example, a first mobile device may (independently or with support) identify one or more operative conditions for a second mobile device (e.g., based on applicable information regarding and/or from the second mobile device). In another example, a server or other like computing device may (independently or with support) identify one or more operative conditions for a second mobile device (e.g., based on applicable information regarding and/or from the second mobile device), and transmit one or more signals indicative of such operative condition(s) to a first mobile device.

With this in mind, in certain example implementations, a first mobile device may determine whether a particular mobile device may potentially be available for wireless signal based positioning, e.g., based, at least in part, on one or more identified operative conditions.

By way of an example, assuming that there are two mobile devices (first and second) identified as being present and co-located with an object, a first mobile device may, at times, determine that only one of the first mobile device and a second mobile device may be potentially available for wireless signal based positioning. In such circumstances, for example, a first mobile device may obtain one or more positioning measurement values based, at least in part, on one or more wireless signals received by the (potentially available) mobile device, and attempt to determine a position fix for the object based, at least in part, on such positioning measurement values.

In another example, again assuming that there are two mobile devices (first and second) identified as being present and co-located with an object, a first mobile device may, at times, determine that both the first mobile device and the second mobile device may be potentially available for wireless signal based positioning. In such circumstances, for example, a first mobile device may obtain one or more first positioning measurement values based, at least in part, on one or more wireless signals received by the first mobile device, and one or more second positioning measurement values based, at least in part, on one or more wireless signals received by the second mobile device, and may attempt to determine a position fix for the object based, at least in part, on at least one positioning measurement value selected from the first positioning measurement values and/or the second positioning measurement values.

Likewise, it should be understood that such techniques may extend to a three or more mobile devices. For example, assuming that there are at least three mobile devices (first, second, third) identified as being present and co-located with an object, a first mobile device may, at times, determine that only a subset of the three mobile devices may be potentially available for wireless signal based positioning. In such circumstances, for example, a first mobile device may obtain one or more positioning measurement values based, at least in part, on one or more wireless signals received by the (potentially available) mobile device(s) in the subset, and attempt to determine a position fix for the object based, at least in part, on such positioning measurement values.

In certain instances, one or more positioning measurement values for a mobile device may be based, at least in part, on at least one wireless signal received by the mobile device subsequent to a determination that the mobile device may be potentially available for wireless signal based positioning. In some instances, one or more positioning measurement values for a mobile device may be based, at least in part, on at least one wireless signal received by the mobile device prior to a determination that the mobile device may be potentially available for wireless signal based positioning.

In certain example implementations, a first mobile device may attempt to obtain one or more positioning measurement values by initiating a search for one or more wireless signals by one of the potentially available mobile devices. Thus, for example, a first mobile may transmit a signal to such a potentially available mobile device indicating that such a search is desired. For example, it may be useful for a mobile device that may be exposed to the environment to search for (e.g., attempt to acquire) one or more SPS signals and/or the like.

In certain example implementations, if it is determined that a particular mobile device (e.g., a second mobile device) may be potentially unavailable for wireless signal based positioning, a first mobile device may transmit one or more signals (e.g., one or more messages) to the second mobile device indicating approval for the second mobile device to consider changing (e.g., transitioning) from a higher usage power state to a lower usage power state, e.g., to conserve power.

In certain instances, if it is determined that the first mobile device may be potentially unavailable for wireless signal based positioning, the first mobile device may, for example, transmit one or more signals to the second mobile device indicating approval for the second mobile device to consider changing (transitioning) from a lower usage power state to a higher usage power state, e.g., to provide/support wireless signal based positioning at the second mobile device.

In certain instances, subsequent to a determination that a second mobile device may be potentially unavailable for wireless signal based positioning, a first mobile device may, for example, transmit one or more signals to the second mobile device indicative of updated wireless signal based positioning data, e.g., to seed the second mobile device with useful information for later use, improve and/or speed up time needed for the second mobile device to determine a position fix in the future, etc.

In certain instances, subsequent to a determination that the first mobile device may be potentially unavailable for wireless signal based positioning, the first mobile device may, for example, receive one or more signals from a second mobile device indicative of updated wireless signal based positioning data, e.g., to seed the first mobile device with useful information for later use, improve and/or speed up time needed for the first mobile device to determine a position fix in the future, etc.

Attention is drawn next to FIG. 1, which is a schematic diagram illustrating an environment 100 within which an object 102 may enter, leave, and/or otherwise move or be moved about, in accordance with an example implementation. As illustrated, a first mobile device 104-1 may be provided and identified as being initially co-located with a first point 106-1 of object 102. Similarly, as shown, a second mobile device 104-2 may be provided and identified as being initially co-located with a second point 106-2 of object 102. Second mobile device 104-2 may transmit one or more wireless signals to first mobile device 104-1, as represented by wireless communication link 105. In certain instances, wireless communication link may represent a unidirectional communication capability, or a bidirectional communication capability.

Although many of the examples presented herein are based on techniques applied using first mobile device 104-1 and second mobile device 104-2, it is not intended that the techniques or claimed subject matter necessarily be limited to just two mobile devices. Accordingly, as illustrated in FIG. 1, techniques and claimed subject matter may apply to a plurality mobile devices (e.g., further represented by Nth mobile device 104-n), which may be individually identified as being initially co-located with particular points (represented by Nth point 106-n) of object 102. Although not shown, it should be understood that Nth mobile device 104-n may be capable of unidirectional or bidirectional wireless communication with one or more other mobile devices, such as, for example, mobile device 104-1.

As further illustrated and represented by portion 108 of object 102, in certain instances object 102 comprise one or more parts or portions may move or be moved in some manner as to change object 102. Thus, in this example, it is assumed that portion 108 may move or be moved with respect to the remaining portion of object 102. For example, portion 108 may represent a leg of a person or an animal, or possible an arm or other like movable feature of a robot or machine.

As further illustrated in FIG. 1, in certain example implementations, one or more other devices 110 may be provided, which may transmit one or more wireless signals 111. By way of example, one or more other devices 110 may represent one or more computing devices (e.g., server(s), etc.), one or more communication networks (wired or wireless), the Internet, etc.

In another example, one or more other devices 110 may represent one or more transmitting devices that may transmit wireless signals 111 for use in wireless signal based positioning. Thus, for example, in certain instances, one or more other devices 110 may represent one or more satellite positioning systems (SPSs) that may transmit SPS signals from one or more space vehicles (SVs). In some embodiments, an SPS may, for example, comprise a global navigation satellite system (GNSS), such as the GPS or Galileo satellite systems. In other embodiments, one or more SVs may be from multiple GNSS such as, but not limited to, GPS, Galileo, Glonass, or Beidou (Compass) satellite systems. In other embodiments, one or more SVs may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples. In yet another example, one or more other devices 110 may represent one or more terrestrial-based wireless transmitting devices, such as, e.g., a dedicated positioning Beacon transmitting device, an access point (AP) device which may be part of a wireless local area network, a base transceiver station which may be part of the cellular telephone system, and/or the like or some combination thereof.

Figure 2:
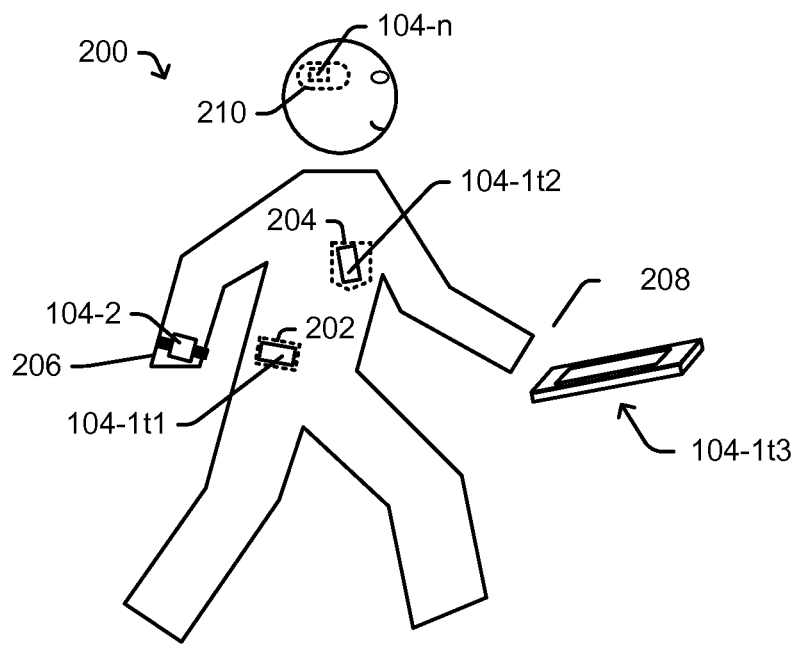
FIG. 2 is an illustrative diagram depicting an example arrangement of representative electronic devices including several example mobile devices that may be co-located with regard to an object comprising a person, in accordance with certain example implementations.

Attention is drawn next to FIG. 2, which is illustrative diagram showing a person 200 (e.g., one example type of an object) in relation to some example mobile devices. In this example, it is assumed that the person is ambulatory and engaged in a pedestrian movement (e.g., walking, running, standing, and/or the like or some combination thereof) from time to time. As shown, in certain instances and/or at certain times (e.g., time t1), person 200 may carry a first mobile device (identified as 104-1t1) in a holder 202 (e.g., possibly a mechanism that may be connected to a belt, possibly a pocket in an item of clothing near the waistline, etc.). Here, for example, the first mobile device may be identified as being co-located with the person's right hip, or the like. In another example, in certain instances and/or at certain times (e.g., time t2), person 200 may carry a first mobile device (identified as 104-1t2) in a jacket pocket 204. Here, for example, the first mobile device may be identified as being co-located with the person's torso. In a third example, in certain instances and/or at certain times (e.g., time t3), person 200 may grasp a first mobile device (identified as 104-1t3) in their left hand and hold it out in front of his/her body (identified in the region of 208) to interact with first mobile device in some manner. Here, for example, the first mobile device may have been initially identified as being co-located with the person's hip (e.g., as at time t1) or torso (e.g., as at time t2), however, as of time t3 the person has moved first mobile device. As may be appreciated, first measurements obtained from a first sensor (e.g., an accelerometer, a gyroscope, etc.) on the first mobile device corresponding to movements corresponding to the new position at time t3 may be substantially different from similar measurements obtained while first mobile device is more closely carried/held nearer the person's hip (time t1) and/or person's torso (time t2). In certain instances, such changes may eventually lead to all or some of the applicable first measurements to be determined to not be accepted for use.

As further illustrated in the simple drawing of FIG. 2, it should be understood that a potential availability of the first mobile device for wireless signal based positioning at times t1 or t2 may be reduced, e.g., due to stowage in a pocket or holder that may under certain circumstances degrade signal reception in some manner. However, a potential availability of the first mobile device for wireless signal based positioning at time t3 (e.g., held in a hand) may be increased, e.g., due to exposure to the environment that may under certain circumstances improve signal reception.

FIG. 2 illustrates an example second mobile device 104-2 in the form of a wearable computing device (here, e.g., a wristband, a wrist watch, etc.) which may be identified as being initially co-located near the wrist of the person's right arm as represented by point 206. As may be expected, the location of second mobile device 104-2 in this example may lead, at times, to the second mobile device being exposed to the environment, which may under certain circumstances improve signal reception and hence increase a potential availability of the second mobile device for wireless signal based positioning.

FIG. 2 also illustrates an example Nth mobile device 104-n in the form of a wearable computing device (here, e.g., a headband, a hat, an earpiece, headphones, glasses, etc.) which may be identified as being initially co-located near a point on the person's head or face as represented by point 210. Note that the Nth mobile device may comprise a "second mobile device", e.g., as recited in claimed subject matter. As may be expected, the location of Nth mobile device 104-n in this example may lead, at times, to the Nth mobile device being exposed to the environment, which may under certain circumstances improve signal reception and hence increase a potential availability of the Nth mobile device for wireless signal based positioning.

Figure 3:
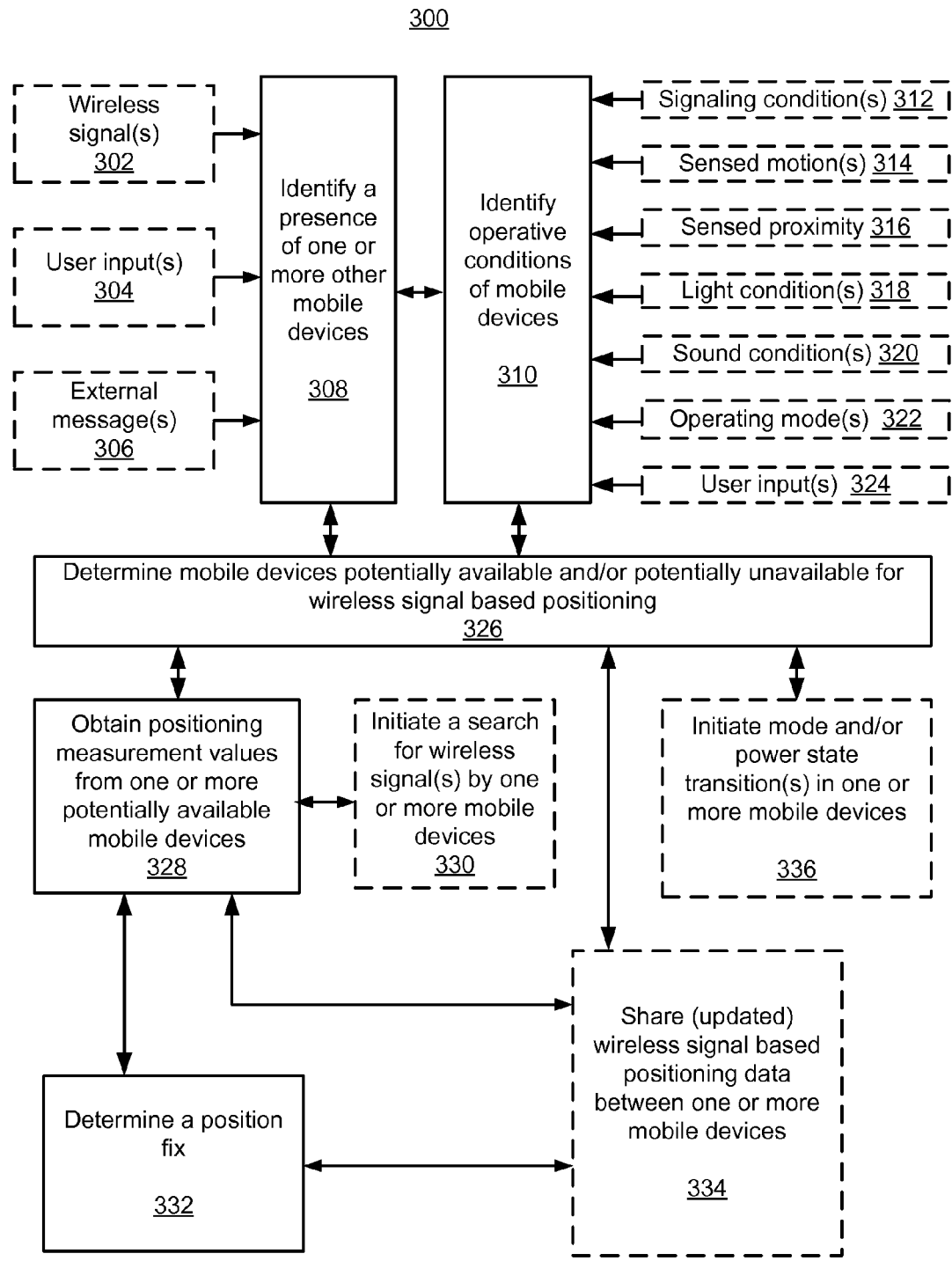
FIG. 3 is a schematic block diagram illustrating an apparatus that may be implemented in a first mobile device, e.g., as in FIG. 1, to determine a position fix of an object co-located with the first mobile device and at least one other mobile device, in accordance with certain example implementations.

Attention is drawn next to FIG. 3, which is a schematic diagram illustrating an example apparatus 300 that may be implemented in whole or part in first mobile device 104-1 (FIG. 1), in accordance with certain example implementations.

As shown, a block 308, a presence of one or more other mobile devices may be identified. For example, a presence of a second mobile device may be identified based, at least in part, on one or more wireless signal(s) 302 exchanged between the first mobile device and the second mobile device. In another example, a presence of a second mobile device may be identified based, at least in part, on one or more user input(s) 304 received by the first mobile device. Here, for example, a user input at a first mobile device may indicate an intended presence and/or approve of a possible presence of one or more mobile devices in co-location with the first mobile device with respect to an object. In yet another example, a presence of a second mobile device may be identified based, at least in part, on one or more external messages (signals) received by the first mobile device from one or more other devices (e.g., a server, etc.). For example, one or more such messages received by a first mobile device may indicate an intended presence and/or approve of a possible presence of one or more mobile devices in co-location with the first mobile device with respect to an object. As with all of the examples presented herein, the above examples claimed subject matter is not necessarily intended to be so limited.

At block 310, one or more operative conditions may be identified for one or more of the mobile devices, e.g., as identified at block 308. As previously described, in certain instances, an operative condition of a particular mobile device may be identified, at least in part, based on various types of information regarding the particular mobile device.

By way of example, some possible types of information are represented by illustration in FIG. 3 as possible inputs to block 308. For example, in certain instances one or more observed signaling conditions 312 corresponding to a particular mobile device be obtained by example apparatus 300 (directly or indirectly) and considered, at least in part, to identify an operative condition at block 308. In certain instances, for example, one or more sensed motions 314 corresponding to a particular mobile device be obtained by example apparatus 300 (directly or indirectly) and considered, at least in part, to identify an operative condition at block 308. In certain instances, for example, one or more sensed proximity indications 316 corresponding to a particular mobile device be obtained by example apparatus 300 (directly or indirectly) and considered, at least in part, to identify an operative condition at block 308. In certain instances, for example, one or more light conditions 318 and/or one or more sound conditions 320 corresponding to a particular mobile device be obtained by example apparatus 300 (directly or indirectly) and considered, at least in part, to identify an operative condition at block 308. In certain instances, for example, one or more operative mode indications 322 corresponding to a particular mobile device (e.g., and/or some part thereof) be obtained by example apparatus 300 (directly or indirectly) and considered, at least in part, to identify an operative condition at block 308. In certain instances, for example, one or more user inputs 324 corresponding to a particular mobile device be obtained by example apparatus 300 (directly or indirectly) and considered, at least in part, to identify an operative condition at block 308.

In certain example implementations, example apparatus 300 may obtain various types of information for consideration at block 308 in different ways. For example, block 310 may obtain information that may be indicative, at least in part, of one or more operative conditions of a particular mobile device by accessing such information, receiving such information, requesting such information, and/or by applying other like techniques or some combination thereof. For example, in certain implementations, apparatus 300 may obtain information for consideration at block 308 from a local memory subsystem of a mobile device comprising apparatus 300. In another example, apparatus 300 may obtain information for consideration at block 308 from one or more other devices through a communication interface, e.g., by exchanging signals. Here, for example, in certain instances a first mobile device 104-1 (see FIG. 1) comprising apparatus 300 may obtain such information applicable to a second mobile 104-2 device directly from the second mobile device 104-2, and/or possibly indirectly via an Nth mobile device 104-n, and/or one or more other devices 110.

As illustrated by the dual directional arrow in FIG. 3, example blocks 308 and 310 may, in certain implementations, be operatively coupled (or possibly combined) in some manner conducive to their respective processes. For example, in certain instances, block 308 may identify one or more mobile devices (e.g., co-located) to be considered at block 310. For example, block 310 may provide information regarding an operative condition of a particular mobile device that may be considered in some manner at block 308 in identifying a presence of such particular mobile device. Here, for example, block 310 may obtain and share certain information regarding the particular mobile device, and/or possibly indicate one or more operative conditions identified for the particular mobile device, which may be considered, at least in part, at block 308. Thus, in a specific example, block 310 may inform block 308 that a particular mobile device may be operating in a particular mode and placed in a particular state, etc., which may in some manner correspond to the particular mobile device as being considered to present or absent. Indeed, in certain implementations, block 308 may obtain all or part of the example information that may be considered by block 310.

At block 326, a determination may be made as to whether a co-located mobile device (e.g., a mobile device comprising apparatus 300, one or more other mobile devices identified at block 308) may be potentially available for wireless signal based positioning or conversely potentially unavailable for wireless signal based positioning. Block 326 may consider, at least in part, one or more of the operative conditions (e.g., from block 310) to determine whether a particular mobile device may be deemed potentially available or potentially unavailable for wireless signal based positioning.

It should be noted that, as used herein, a mobile device that is determined (e.g., at block 326) to be "potentially available" or "potentially unavailable", may or may not actually be available or otherwise capable of providing/supporting wireless signal based positioning in some manner. In other words, in this example, the determination at block 326 may or may not correspond to an actual availability; as such, to account for such a possibility, the terms "potentially available" and "potentially unavailable" are used herein.

While examples presented herein illustrate that a determination that a given mobile device may be determined to be classified as either "potentially available" or "potentially unavailable", it should be understood that there may be a plurality of identifiable classifiers. For example, additional (possibly a subset) or different (possibly new) classifications may result from certain determinations at block 326. By way of some examples, a determination at block 326 may indicate that a mobile device may be known or proven (e.g., as currently, temporarily, etc.) to be "available" or "unavailable", or perhaps "busy", "hibernating", "configuring", "low on power", "charging", "not responding", and/or the like or some combination thereof.

Consequently, the terms "potentially available" or "potentially unavailable", are intended to simply indicate two resulting classifications based on a decision process (e.g., at block 326) capable of having two or more resulting classifications. Thus, in certain instances, it may be beneficial to consider such decision process to result in a "first classification" (e.g., "potentially available", etc.) and a "second classification" (e.g., "potentially unavailable", etc.), and, in certain instances, possibly a "third classification", a "fourth classification", . . . "Kth classification".

As previously mentioned, an operative condition may be based on a variety of factors (e.g., see example information that may be considered at block 310) may be indicative in some manner as whether a mobile device may be more or less likely to be useful in providing/supporting certain wireless signal based positioning.

Those skilled in the art should recognize that a variety of decisional techniques may be applied at example blocks 310, 312, and/or 326. For example, in certain instances, one or more of the decisions at blocks 310, 312, and/or 326 may be based, at least in part, on a comparison of recently obtained applicable information/data with corresponding previously obtained (or possibly expected/predicted) information/data. For example, in certain instances, one or more of the decisions at blocks 310, 312, and/or 326 may be based, at least in part, on a comparison of obtained applicable information/data with corresponding threshold value(s). For example, in certain instances, one or more metric values/scores and/or the like pertaining to obtained applicable information/data based, at least in part, on some evaluation criteria may be calculated via one or more of the decisions at blocks 310, 312, and/or 326. Of course these represent just a few example decision techniques that may be selectively applied at blocks 310, 312, and/or 326, and claimed subject matter is not necessarily intended to be so limited.

At example block 328, one or more positioning measurement values may be obtained, e.g., from one or more of the mobile devices determined to be potentially available for wireless signal based positioning at block 326. In certain instances, one or more positioning measurement values may be obtained from memory locally provided for apparatus 300 and/or a first mobile device. In certain instances, one or more positioning measurement values from a reporting mobile device (e.g., a second mobile device) may be obtained (directly or indirectly) via applicable wireless signal communications.

In certain example implementations, a positioning measurement value may be indicative, at least in part, of any information in the form of data that may be used, at least in part, e.g., at block 332, to determine a position fix for the object. Thus, for example, in certain instances a positioning measurement value (e.g., corresponding to a reporting mobile device, the object, a transmitting device) may be indicative, at least in part, of one or more distances/ranges (e.g., a time of travel, a signal strength, a pseudorange, etc.) and/or the like, one or more location coordinates e.g., latitude, longitude, altitude, etc.) and/or the like, one or more identifiable spaces (e.g., a grid/node point, a room identifier, a location context identifier (LCI), a cellular ID, etc.), one or more movements (e.g., a heading, a speed, a trajectory, etc.), just to name a few examples.

In certain instances, one or more positioning measurement values may be further based, at least in part, on detected motions and/or the like from one or more inertial sensors (e.g., an accelerometer, a gyroscope, a pedometer, etc.), one or more environmental sensors (e.g., a magnetometer, a compass, a barometer, a light sensor, an sound/audio sensor, a proximity sensor, a thermometer, a strain gauge, etc.), on board a reporting mobile device.

At example block 330, in certain example implementations, apparatus 300 may take some action to initiate a search for one or more wireless signals by one or more wireless devices. For example, apparatus 300 may instruct a first mobile device comprising apparatus 300 and/or one or more other mobile devices (e.g., determined to be potentially available at block 326) to attempt to acquire one or more particular wireless signals from one or more transmitting devices to obtain (e.g., or possibly update, refine, etc.) one or more positioning measurement values.

At example block 332, all or part of a position fix (e.g., that may correspond to the object) may be determined, e.g., based, at least in part, on one or more of the positioning measurement values obtained at block 328. By way of some non-limiting examples, a position fix may be indicative, at least in part, of a relative and/or otherwise identifiable location of the object, e.g., determined with regard to a coordinate system, an electronic map, another object, a point in space, a structure, and/or the like or some combination thereof. In certain instances, a position fix determined at block 332 may be based, at least in part, on one or more positioning measurement values corresponding to one of the mobile device(s) identified as being co-located with the object, e.g., the object's determined position fix may match a position fix of such mobile device, or possibly offset in some manner therefrom. In certain instances, a position fix determined at block 332 may be based, at least in part, on positioning measurement values corresponding to a plurality of mobile devices identified as being co-located with the object. Here, for example, the object's determined position fix may be based, at least in part, on a combination of position fixes for two or more such mobile devices. Thus, in certain instances position fixes and/or obtained positioning measurement values for two or more mobile devices may be averaged or otherwise mathematically/statistically combined in some manner, e.g., possibly taking into account: a type, a shape, a modeled/expected behavior, etc., of the object; an age, an accuracy, etc., of one or more of the various position fixes and/or obtained positioning measurement values; a history of one or more of the various position fixes and/or obtained positioning measurement values, etc.; and/or the like or some combination thereof.

In certain instances, a position fix may be indicative, at least in part, of a motion or movement of the object, e.g., determined with regard to a coordinate system, an electronic map, another object, a point in space, a structure, and/or the like or some combination thereof.

It should be noted that dashed line boxes that appear in the drawings (e.g., example referenced items 106-n (FIG. 1), 104-n (FIG. 2), 330 (FIG. 3), 418 (FIG. 4), and 510 (FIG. 5B) are intended to illustrate additional/alternative devices, information/data, instructions/processes, and/or the like that may be provided/applied in certain example implementations. However, it should also be understood that example referenced items illustrated in solid line boxes in the drawing may be considered as additional/alternative devices, information/data, instructions/processes, and/or the like that may be provided/applied in certain example implementations. Thus, claimed subject matter is not intended to necessarily be so limited.

At example block 334, in certain instances information (e.g., data, instructions, etc.) and/or the like corresponding to wireless signal based positioning that may be available at one or more mobile devices may be shared, in whole or part, with one or more other mobile device and/or one or more other devices (e.g., a server, a network computing device, etc.). By way of example, at block 334, in certain instances apparatus 300 may instruct first mobile device 104-1 (FIG. 1) to transmit various forms of information corresponding to and/or for possible use in wireless signal based positioning to a second mobile device 104-2, an Nth mobile device 104-n, and/or one or more other devices 110. In another example, at block 334, in certain instances apparatus 300 may receive (possibly in response to a request) various forms of information corresponding to and/or for possible use in wireless signal based positioning via first mobile device 104-1 as received from a second mobile device 104-2, an Nth mobile device 104-n, and/or one or more other devices 110. Such various forms of information that may be transmitted by apparatus 300 may, for example, be based, at least in part, on the various information and/or processing as represented by one or more of referenced items 302 through 332 and/or 336 in FIG. 3. Such various forms of information that may be received by apparatus 300 may, for example, be based, at least in part, on the various information and/or processing obtained by apparatus 300.

In certain example implementations, such various forms of information may comprise various types of positioning assistance data (e.g., electronic maps, signal heatmaps, routing information, SPS almanac information, etc.), that may be useful to apparatus 300 and/or one or more of the mobile devices 104-1, 104-2, and/or 104-*n* (FIG. 1), to provide/support wireless signal positioning. For example, it may be beneficial to provide current/updated positioning assistance data and/or the like to a mobile device that may have recently become or may be expected to become potentially available for wireless signal based positioning.

At example block 336, in certain implementations apparatus 300 may initiate one or more mode and/or power state transitions in one or more of the mobile devices. For example, apparatus 300 may initiate such transitions, based, at least in part, on information considered and/or determinations made at decision processes represented at blocks 308, 310, 326, 328, 330, 332, and 334, just to name a few examples. Here, for example, at block 336 apparatus 300 may initiate transmission of one or more signals from a first mobile device 104-1 to a second mobile device 104-2 (FIG. 1) indicating an approval for second mobile device 104-2 to change from a higher usage power state to a lower usage power state. For example, if second mobile device 104-2 is determined at block 326 to be potentially unavailable for wireless signal based positioning, it may be beneficial for second mobile device 104-2 to transition from a higher usage power state to a lower usage power state, e.g., possibly reducing power consumption, processing load, etc., at second mobile device 104-2. In certain instances, for example, a higher usage power state and/or other like mode of operation may comprise maintaining power to operate one or more receivers that may be used in wireless signal based positioning, and conversely, a lower usage power state and/or other like mode of operation may comprise reducing/removing power to one or more such receivers or some portion thereof.

In another example, a higher usage power state and/or other like mode of operation may comprise maintaining power to operate one or more sensors, and conversely, a lower usage power state and/or other like mode of operation may comprise reducing/removing power to one or more such sensors or some portion thereof.

In yet another example, a higher usage power state and/or other like mode of operation may comprise maintaining power to operate one or more user input and/or output units, and conversely, a lower usage power state and/or other like mode of operation may comprise reducing/removing power to one or more such input and/or output units or some portion thereof.

In still another example, a higher usage power state and/or other like mode of operation may comprise maintaining power to operate one or more communication interfaces, and conversely, a lower usage power state and/or other like mode of operation may comprise reducing/removing power to one or more such communication interfaces or some portion thereof.

In certain examples, a higher usage power state and/or other like mode of operation may comprise operating all or part of one or more processing units according to first instruction(s)/code, and conversely, a lower usage power state and/or other like mode of operation may comprise operating all or some portion of one or more processing units according to (different) second instruction(s)/code.

Figure 4:
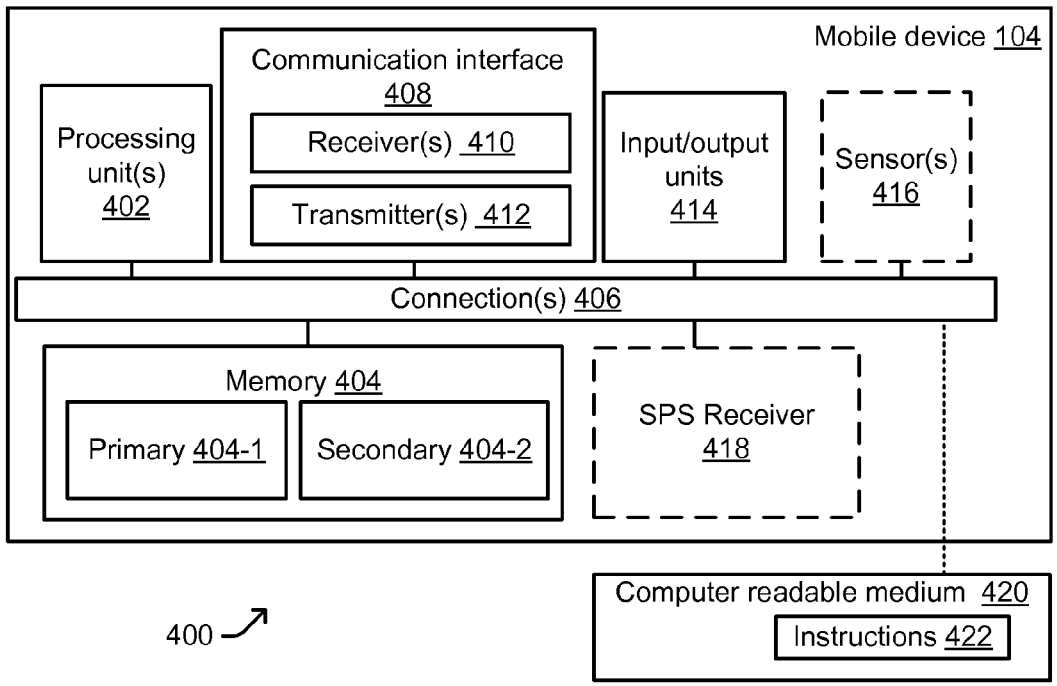
FIG. 4 is a schematic diagram illustrating certain features of an example computing platform that may be provisioned in whole or part within a mobile device, e.g., as in FIG. 1, in accordance with certain example implementations.

FIG. 4 is a schematic diagram illustrating certain features of an example special purpose computing platform 400 that may be provided within a mobile device according to the various techniques provided herein. It should be understood that all or part of the features shown in computing platform 400 may be provided in first mobile device 104-1, second mobile device 104-2, and/or Nth mobile device 104-*n* (FIG. 1). It should also be understood that the example features shown in computing device 400 are not intended to show an exhaustive list of features that may be provided within a mobile device. Further still, it should be understood that in certain instances, one or more, or all, of the mobile devices may be of the same or of a different type, form, manufacture, make, model, etc.

As illustrated, special purpose computing platform 400 may comprise one or more processing units 402 (e.g., to perform data processing in accordance with certain techniques provided herein) coupled to memory 404 via one or more connections 406 (e.g., one or more electrical conductors, one or more electrically conductive paths, one or more buses, one or more fiber-optic paths, one or more circuits, one or more buffers, one or more transmitters, one or more receivers, etc.). Processing unit(s) 402 may, for example, be implemented in hardware or a combination of hardware and software. Processing unit(s) 402 may be representative of one or more circuits configurable to perform at least a portion of a data computing procedure or process. By way of example but not limitation, a processing unit may include some form of a system-on-a-chip (SOC), one or more processors, controllers, microprocessors, microcontrollers, application specific integrated circuits, digital signal processors, programmable logic devices, field programmable gate arrays, or the like, or any combination thereof.

Memory 404 may be representative of any data storage mechanism. Memory 404 may include, for example, a primary memory 404-1 and/or a secondary memory 404-2. Primary memory 404-1 may comprise, for example, a random access memory, read only memory, etc. While illustrated in this example as being separate from the processing units, it should be understood that all or part of a primary memory may be provided within or otherwise co-located and coupled with processing unit 402 or other like circuitry within the mobile device. Secondary memory 404-2 may comprise, for example, the same or similar type of memory as primary memory and/or one or more data storage devices or systems, such as, for example, a solid motion state memory drive, etc. In certain implementations, secondary memory may be operatively receptive of, or otherwise configurable to couple to, a non-transitory computer readable medium 420. Memory 404 and/or non-transitory computer readable medium 420 may comprise instructions 422 for use in performing data processing, e.g., in accordance with the applicable techniques as provided herein.

Special purpose computing platform 400 may, for example, further comprise one or more communication interfaces 408. Communication interface 408 may, for example, comprise one or more wired and/or wireless network interface units, radios, modems, etc., represented here by one or more receivers 410 and one or more transmitters 412. It should be understood that in certain implementations, communication interface 408 may comprise one or more transceivers, and/or the like. Further, it should be understood that although not shown, communication interface 408 may comprise one or more antennas and/or other circuitry as may be applicable given the communication interface capability.

In accordance with certain example implementations, communication interface 408 may, for example, be enabled for use with various wired communication networks, e.g., such as telephone system, a local area network, a wide area network, a personal area network, an intranet, the Internet, etc.

In accordance with certain example implementations, communication interface 408 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 408 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN.

Representative mobile device 104 in FIG. 4 may, for example, further comprise one or more input and/or output units 414. Input and/or output units 414 may represent one or more devices or other like mechanisms that may be used to obtain inputs from and/or provide outputs to one or more other devices and/or a user. Thus, for example, input and/or output units 414 may comprise various buttons, switches, a touch pad, a trackball, a joystick, a touch screen, a keyboard, a microphone, a camera, an eye tracker, and/or the like, which may be used to receive one or more user inputs. In certain instances, input and/or output units 414 may comprise various devices that may be used in producing a visual output, an audible output, and/or a tactile output for a user. For example, input and/or output units 414 may be used to present a video display, graphical user interface, positioning and/or navigation related information, visual representations of electronic map, routing directions, etc., via a display mechanism and/or audio mechanism.

Representative mobile device 104 in FIG. 4 may, for example, comprise one or more sensors 416. For example, sensor(s) 416 may represent one or more environmental sensors, such as, e.g., a magnetometer or compass, a barometer or altimeter, etc., and which may be useful for positioning and/or determining a certain movements. For example, sensor(s) 416 may represent one or more inertial sensors, which may be useful in detecting certain movements. Thus for example, sensor(s) 416 may comprise one or more accelerometers, one or one or more gyroscopes. Further, in certain instances sensor(s) 416 may comprise and/or take the form of one or more input devices such as a sound transducer, a microphone, a camera, a light sensor, etc.

In certain instances, some mobile devices may comprise a satellite positioning system (SPS) receiver 418 for acquiring SPS signals 134 via one or more antennas (not shown). SPS receiver 418 may also process, in whole or in part, acquired SPS signals 134 for estimating a position and/or a motion of a mobile device. In certain instances, SPS receiver 418 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of a mobile device. In certain implementations, all or part of such processing of acquired SPS signals may be performed by other processing capabilities in a mobile device, e.g., processing unit(s) 402, memory 404, etc., in conjunction with SPS receiver 418. Storage of SPS or other signals for use in performing positioning operations may be performed in memory 404 or registers (not shown).

In certain instances, sensor(s) 416 may generate analog or digital signals that may be stored in memory 404 and processed by DPS(s) (not shown) or processing unit(s) 402 in support of one or more applications such as, for example, applications directed to positioning or navigation operations based, at least in part, on one or more positioning functions.

Processing unit(s) 402 may comprise a dedicated modem processor or the like that may be capable of performing baseband processing of signals acquired and down converted at receiver(s) 410 of communication interface 408 or SPS receiver 418. Similarly, a modem processor or the like may perform baseband processing of signals to be up converted for transmission by (wireless) transmitter(s) 412. In alternative implementations, instead of having a dedicated modem processor, baseband processing may be performed by a general purpose processor or DSP (e.g., general purpose and/or application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

Figure 5A:
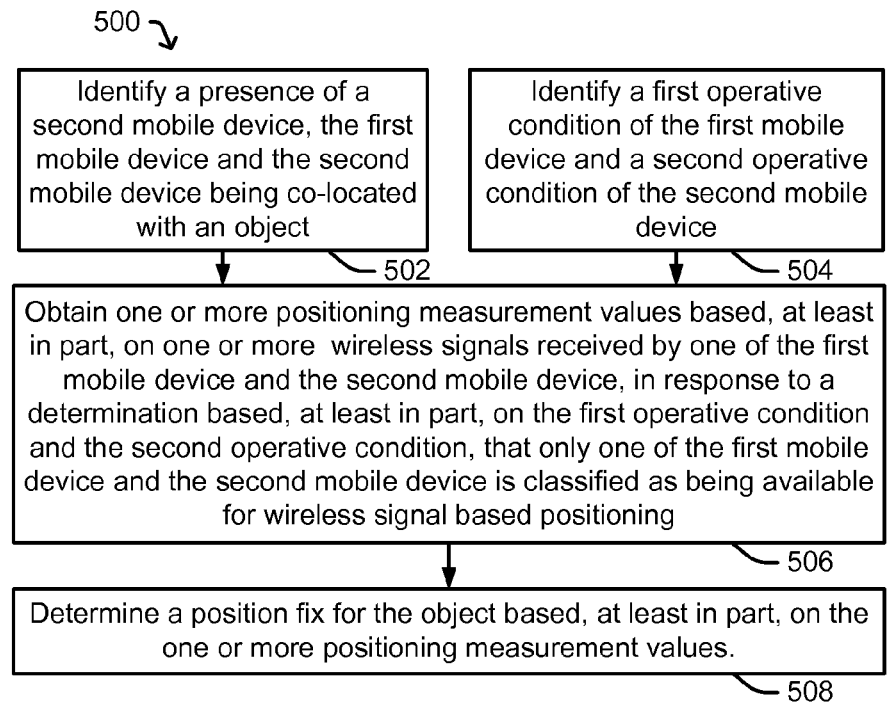
FIG. 5A and FIG. 5B are flow diagrams illustrating some example processes that may be implemented in a first mobile device, e.g., as in FIG. 1, to determine a position fix of an object co-located with the first mobile device and at least one other mobile device, in accordance with certain example implementations.

Attention is drawn next to FIG. 5A, which is a flow diagram illustrating an example process 500 that may be implemented in whole or in part by example first mobile device 104-1 (FIG. 1), example apparatus 300 (FIG. 3), example special purpose computing platform 400 (FIG. 4), and/or other like electronic devices/circuits, in accordance with certain example implementations.

At example block 502, at a first mobile device, a presence of a second mobile device may be identified, wherein such presence may be indicative that at least the first and second mobile devices are deemed to be co-located with an object. In certain example implementations, block 502 may comprise all or part of the example decision block 308 (FIG. 3) and/or make use of all or part of the example information considered therein.

At example block 504, the first mobile device may identify at least a first operative condition of the first mobile device and at least a second operative condition of the second mobile device. In certain example implementations, block 504 may comprise all or part of the example decision block 310 (FIG. 3) and/or make use of all or part of the example information considered therein.

At example block 506, in response to a determination based, at least in part, on at least the first operative condition and the second operative condition, that only one of the first mobile device and the second mobile device is classified as being available for wireless signal based positioning, the first mobile device may obtain one or more positioning measurement values based, at least in part, on one or more wireless signals received by the ("available") one of the first or second mobile devices. In certain example implementations, block 506 may comprise all or part of one or more of the example decision blocks 326, 328, 330, 334, and/or 336 (FIG. 3), and/or make use of all or part of the example information considered therein.

At example block 508, the first mobile device may determine a position fix for the object based, at least in part, on the one or more positioning measurement values obtain at block 506. In certain example implementations, block 508 may comprise all or part of the example decision block 332 (FIG. 3) and/or make use of all or part of the example information considered therein.

Figure 5B:
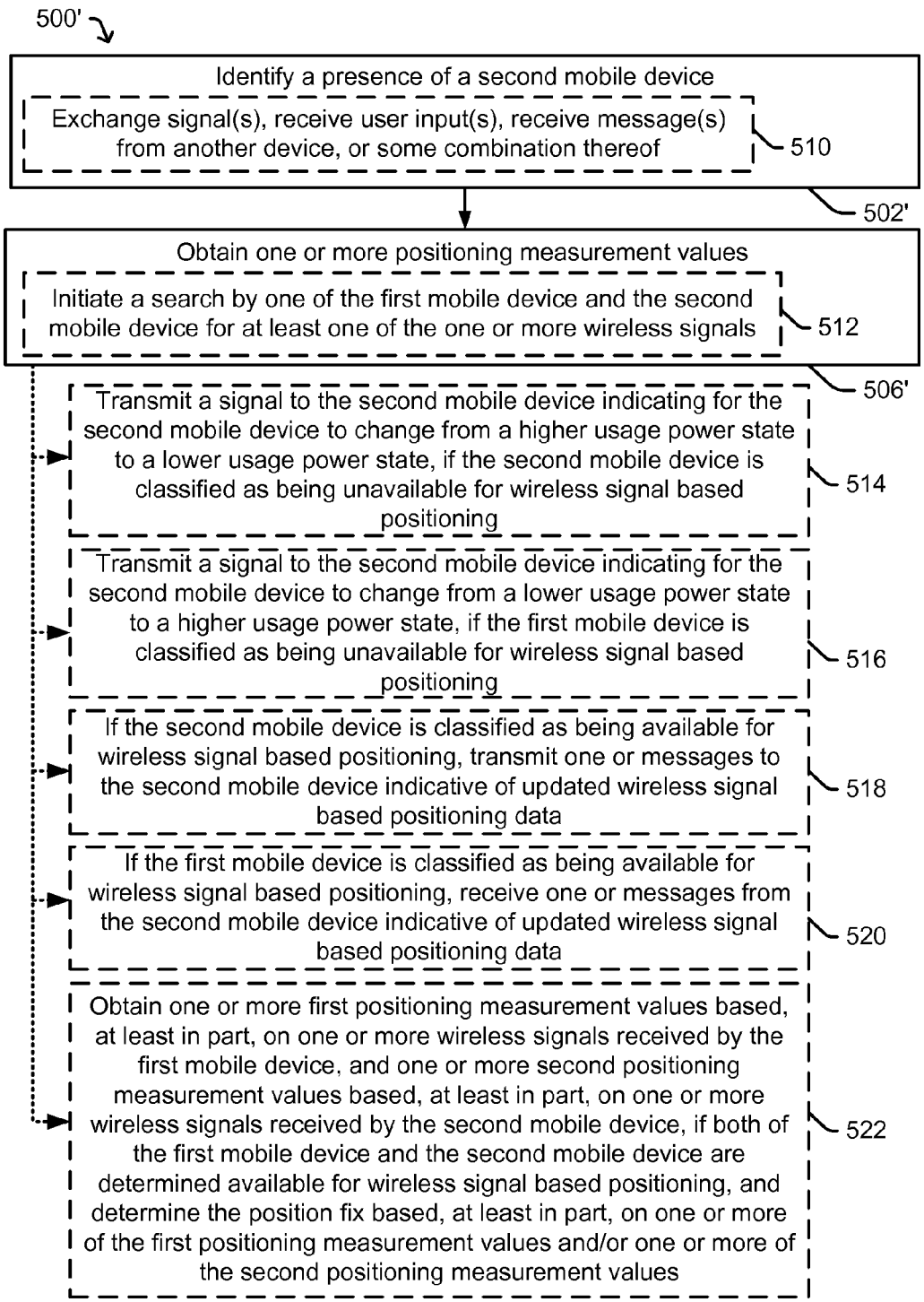

Attention is drawn next to FIG. 5B, which is a flow diagram illustrating an example process 500' that may be implemented in whole or in part by example first mobile device 104-1 (FIG. 1), example apparatus 300 (FIG. 3), example special purpose computing platform 400 (FIG. 4), and/or other like electronic devices/circuits, in accordance with certain example implementations.

In certain implementations, example block 502 in FIG. 5A may be replaced or otherwise modified in whole or part by example block 502' and/or example block 510, as shown in FIG. 5B.

In certain implementations, example block 506 in FIG. 5A may be replaced or otherwise modified in whole or part by example block 506' and/or example blocks 512, 514, 516, 518, 520, and/or 522, as shown in FIG. 5B.

At example block 502', at a first mobile device, a presence of a second mobile device may be identified. In certain instances, at example block 510, first mobile device may identify a presence of a second mobile device based, at least in part, on one or more of an exchange signal(s), receiving user input(s), receiving message(s) from another device, or some combination thereof, just to name a few examples.

At example block 506', the first mobile device may obtain one or more positioning measurement values based, at least in part, on one or more wireless signals received by the ("available") one of the first or second mobile device. In certain instances, at example block 512, the first mobile device may further initiate a search for at least one of the one or more wireless signals by the ("available") one of the first or second mobile device. In certain example implementations, blocks 506' and/or 512 may comprise all or part of the example decision blocks 328 and/or 330 (FIG. 3) and/or make use of all or part of the example information considered therein.

At example block 514, in certain implementations a first mobile device may transmit a signal to a second mobile device indicating approval for the second mobile device to change from first state or mode, to a second state or more. For example, at example block 514, in certain implementations a first mobile device may (e.g., in response to a determination that a second mobile device is classified as being unavailable for wireless signal based positioning), transmit a signal to the second mobile device indicating approval for the second mobile device to change from a higher usage power state to a lower usage power state. In certain example implementations, block 514 may comprise all or part of example decision block 336 (FIG. 3) and/or make use of all or part of the example information considered therein.

At example block 516, in certain implementations a first mobile device may transmit a signal to a second mobile device indicating approval for the second mobile device to change from first state or mode, to a second state or more. For example, at example block 516, in certain implementations a first mobile device may (e.g., in response to a determination that the first mobile device is classified as being unavailable for wireless signal based positioning), transmit one or more signals to a second mobile device indicating approval for the second mobile device to change from a lower usage power state to a higher usage power state. In certain example implementations, block 514 may comprise all or part of example decision block 336 (FIG. 3) and/or make use of all or part of the example information considered therein.

At example block 518, in certain implementations a first mobile device may transmit one or signals to the second mobile device indicative of updated wireless signal based positioning data. For example, at example block 518, a first mobile device may (e.g., subsequent to a determination that a second mobile device is classified as being unavailable for wireless signal based positioning), transmit one or more such signals to the second mobile device indicative of updated wireless signal based positioning data. As a result, the second mobile device may be provided with updated wireless signal based positioning data, which may be beneficial in the event that the second mobile device is subsequently re-classified as being available for wireless signal based positioning. In certain example implementations, block 516 may comprise all or part of example decision block 334 (FIG. 3) and/or make use of all or part of the example information considered therein.

At example block 520, in certain implementations a first mobile device may receive one or signals from a second mobile device indicative of updated wireless signal based positioning data. For example, at example block 520, a first mobile device may (e.g., subsequent to a determination that the first mobile device is classified as being unavailable for wireless signal based positioning), receive one or more such signals to the second mobile device indicative of updated wireless signal based positioning data. As a result, the first mobile device may be provided with updated wireless signal based positioning data, which may be beneficial in the event that the first mobile device is subsequently re-classified as being available for wireless signal based positioning. In certain example implementations, block 516 may comprise all or part of example decision block 334 (FIG. 3) and/or make use of all or part of the example information considered therein.

In furtherance of example block 506 in FIG. 5A, at example block 522 in FIG. 5B, in response to a determination that both of the first mobile device and the second mobile device are classified as being available for wireless signal based positioning, the first mobile device may obtain one or more first positioning measurement values based, at least in part, on one or more wireless signals received by the first mobile device, and one or more second positioning measurement values based, at least in part, on one or more wireless signals received by the second mobile device, and determine a position fix for the object based, at least in part, on one or more positioning measurement value selected from the first positioning measurement value(s) and/or one or more of the second positioning measurement value(s).

In particular implementations, measurements or observations obtained from different mobile devices attached to a user may be used for a navigation operation. In the particular implementation shown in FIGS. 1 and 2, for example, first and second mobile devices 104-1 and 104-2 may both receive signals transmitted by transmitters (e.g., IEEE std. 802.11 access points, cellular base stations, femtocell transceiver devices, etc.). For example, the first mobile device and the second mobile device may each observe signals transmitted by two or more transmitters. In an embodiment, observations obtained from the first mobile device may be fused with observations obtained by the second mobile device in a navigation operation such as computing a position fix.

Depending on any one of several factors as discussed above (e.g., concealment of receiver relative to the path of signals transmitted by the two or more transmitters), for performing a navigation operation an observation of a signal obtained the first mobile device may have greater utility than an observation of the signal obtained at the second mobile device. Likewise, an observation of a different signal obtained by the second mobile device may have greater utility than an observation of the different signal obtained by the first mobile device. In this context, "utility" of an observation of signal may indicate a usefulness of the observation relative to a different observation of the signal (e.g., obtained by a different device). For example, a utility of an observation may be indicated by, for example, a degree to which a receiver obtaining the observation is obscured or concealed from a signal being observed, a measured received signal strength, measured signal to noise ratio, a measurement of the presence of multipath, a measurement of a presence of signal interference, just to provide a few examples.

Figure 6:
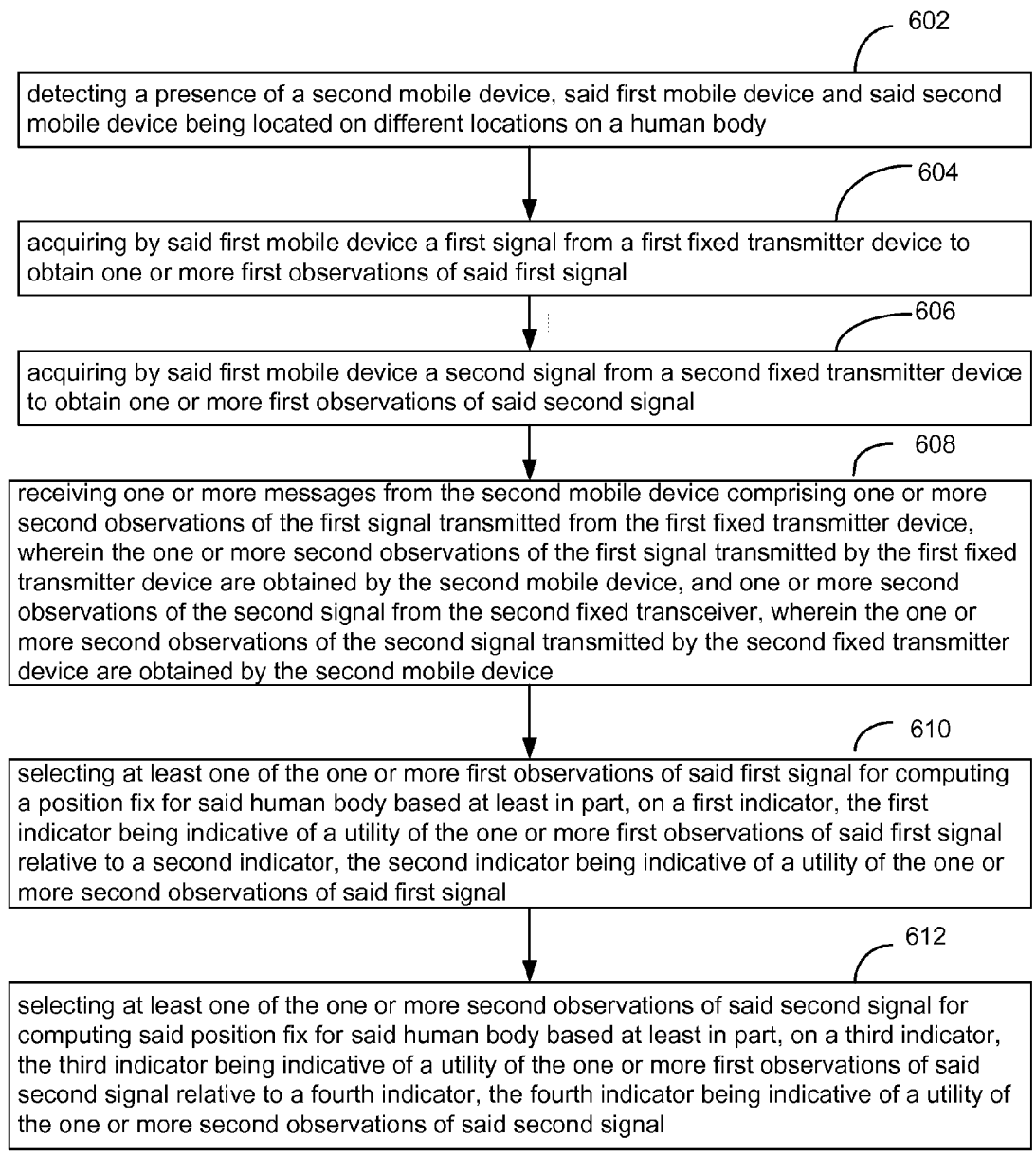
FIG. 6 is a flow diagram of a process to select observations from among multiple devices for performing operations according to an embodiment.

FIG. 6 is a flow diagram of a process performed by a first mobile device select from among multiple observations from multiple devices such as the first mobile device (e.g., first mobile device 104-1) and a second mobile device (e.g., second mobile device 104-2 or Nth mobile device 104-n) (FIG. 1). For example, aspects of the process shown in FIG. 6 may be implemented in whole or in part by example first mobile device 104-1, example apparatus 300 (FIG. 3), example special purpose computing platform 400 (FIG. 4), and/or other like electronic devices/circuits, in accordance with certain example implementations. The first and second mobile devices may be attached to different locations of a human body. While the specific example embodiment of FIG. 6 is directed to selection between two mobile devices to provide observations, other embodiments may be directed to selection from among three or more mobile devices co-located with a human user. At block 602, the first mobile device may detect a presence of the second mobile device based, at least in part, on one or more of an exchange of signal(s), receiving user input(s) at a user interface, receiving message(s) from the second mobile device, or any combination thereof, for example.

At block 604, the first mobile device may acquire a first signal from a first fixed transmitter device to obtain one or more first observations of the first signal. The first fixed transmitter device may comprise, for example, a transceiver device such as a WWAN access transceiver (e.g., base station or femtocell transceiver), WLAN access point, WPAN transceiver, just to provide a few examples. Such observations may include measurements of aspects of the first signal such as, for example, received signal strength (e.g., RSSI), signal round-trip time (RTT), code phase, just to provide a few examples. Similarly, at block 606, the first mobile device may acquire a second signal from a second fixed transmitter device to obtain one or more first observations of the second signal.

Like the first mobile device at blocks 604 and 606, the second mobile device may acquire the first signal transmitted by the first fixed transmitter device to obtain one or more second observations of the first signal and acquire the second signal transmitted by the second mobile device to obtain one or more second observations of the second signal. In this context, first and second observations of the "first signal" need not be obtained simultaneously. For example, the first signal may be acquired by the first and second mobile devices at different times. In addition, first and second observations may relate to different aspects or characteristics of the first signal such as, for example, measured RSSI, RTT, code phase, frequency/Doppler, just to provide a few examples of different aspects of an acquired signal that may be observed at a receiver.

At block 608, the first mobile device may receive one or more messages from the second mobile device (e.g., over a wireless link using any one of several techniques discussed herein) containing one or more second observations of the first signal and one or more second observations of the second signal. With different first and second observations of the first signal, the first mobile device select between the first and second observations of the first signal for use in subsequent computation (e.g., to compute a position fix). Likewise, with different first and second observations of the first signal, the first mobile device select between the first and second observations of the second signal for use in the subsequent computation.

At block 610, the first mobile device may select between the first and second observations of the first signal for computing position fix based, at least in part, on a first indicator of utility of the first observations of the first signal and a second indicator of utility of the second observations of the first signal. As discussed above the first and second indicators of utility may comprise, for example, a degree to which a receiver obtaining the observation is obscured or concealed from a signal being observed, a measured received signal strength, measured signal to noise ratio, a measurement of the presence of multipath or a measurement of a presence of signal interference, or any combination thereof, just to provide a few examples. Here, block 610 may select at least one of the one or more first observations of the first signal if the first indicator of utility is higher than the second indicator (e.g., suggesting that the one or more first observations are more useful in computing the position fix than the one or more second observations). First and second indicators may take any one of several quantitative or symbolic forms. In another particular embodiment, an indicator of a utility of an observation may be obtained (e.g., by the first or second mobile device) by taking an initial radio frequency scan operation (e.g., passive or active scan) of a signal to be observed. The indicator may be then be determined or quantified based, at least in part, on measurements obtained in the course of the scan operation. In one particular example, first and second indicators may comprise numerical values that may be compared by a threshold to determine whether first or second observations of the one or more first observations provide the highest utility.

In a similar fashion, at block 612 the first mobile device may select between first and second observations of the second signal for use in computing the position fix. As pointed out above, the first mobile device at block 612 may select between first and second observations of the second signal based, at least in part, on third and fourth indicators of utility of the first and second observations of the second signal.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for obtaining a position fix for a human body comprising, at a first mobile device:
   detecting a presence of a second mobile device, said first mobile device being located on a first location of said human body and said second mobile device being located on a second location of said human body different from the first location on said human body;
   acquiring by said first mobile device a first signal from a first fixed transmitter device to obtain one or more first observations of said first signal, the one or more first observations of said first signal comprising one or more first observations of a received signal strength of said first signal or one or more first observations of a time of arrival of said first signal, or a combination thereof;
   acquiring by said first mobile device a second signal from a second fixed transmitter device to obtain one or more first observations of said second signal, the one or more first observations of said second signal comprising one or more first observations of a received signal strength of said second signal or one or more first observations of a time of arrival of said second signal, or a combination thereof;
   receiving one or more messages from the second mobile device through a wireless link between said first mobile device and said second mobile device comprising one or more second observations of the first signal transmitted from the first fixed transmitter device, wherein the one or more second observations of the first signal transmitted by the first fixed transmitter device are obtained by the second mobile device and comprise one or more second observations of said received signal strength of said first signal or one or more first observations of said time of arrival of said first signal, or a combination thereof, and one or more second observations of the second signal from the second fixed transmitter device, wherein the one or more second observations of the second signal transmitted by the second fixed transmitter device are obtained by the second mobile device and comprise one or more second observations of said received signal strength of said second signal or one or more second observations of said time of arrival of said second signal, or a combination thereof;

selecting at least one of the one or more first observations of said first signal for computing the position fix for said human body based at least in part, on a first indicator, the first indicator being indicative of a utility of the one or more first observations of said first signal relative to a second indicator, the first indicator being based, at least in part, on one or more of the following factors: a degree to which the first mobile device is concealed or obscured from receiving the first signal; a measured first received signal strength; a first measured signal to noise ratio; a first measurement of a presence of multipath; or a first measurement of a presence of signal interference, the second indicator being indicative of a utility of the one or more second observations of said first signal;

selecting at least one of the one or more second observations of said second signal for computing said position fix for said human body based at least in part, on a third indicator, the third indicator being indicative of a utility of the one or more first observations of said second signal relative to a fourth indicator, the third indicator being based, at least in part, on one or more of the following factors: a second degree to which the first mobile device is concealed or obscured from receiving the first signal; a second measured received signal strength; a second measured signal to noise ratio; a second measurement of a presence of multipath; or a second measurement of a presence of signal interference, the fourth indicator being indicative of a utility of the one or more second observations of said second signal; and combining the selected at least one of the one or more first observations of said first signal and the selected at least one of the one or more second observations of second signal for determining said position fix.

2. The method of claim 1, wherein said first indicator is determined based, at least in part, on an output signal from a light sensor of said first mobile device.

3. The method of claim 1, and further comprising:
initiating a scan operation of said first signal transmitted from said first fixed transmitter device; and
determining said first indicator based, at least in part, on measurements obtained based, at least in part, on said scan operation.

4. The method of claim 1, and further comprising:
transmitting one or more messages to said second mobile device in response to detection of said presence of said second mobile device; and
receiving one or more response messages from said second mobile device indicating a capability to provide observations of signals.

5. The method of claim 1, wherein said one or more first observations of said first signal comprise one or more measurements of round-trip time.

6. A first mobile device comprising:
a transceiver device for transmitting messages to and receiving messages from a wireless communication network; and
one or more processors to:
detect a presence of a second mobile device, said first mobile device being located on a first location of a human body and said second mobile device being located on a second location of said human body different from the first location on said human body;
obtain one or more observations of a first signal transmitted by a first fixed transmitter device and acquired at said transceiver device, the one or more first observations of said first signal comprising one or more first observations of a received signal strength of said first signal or one or more first observations of a time of arrival of said first signal, or a combination thereof;
obtain one or more observations of a second signal transmitted from a second fixed transmitter device and acquired at said transceiver device, the one or more first observations of said second signal comprising one or more first observations of a received signal strength of said second signal or one or more first observations of a time of arrival of said second signal, or a combination thereof;
obtain, from one or more messages received at the transceiver device from the second mobile device, one or more second observations of the first signal transmitted from the first fixed transmitter device, wherein the one or more second observations of the first signal transmitted by the first fixed transmitter device are obtained by the second mobile device and comprise one or more second observations of said received signal strength of said first signal or one or more second observations of said time of arrival of said first signal, or a combination thereof, and one or more second observations of the second signal from the second fixed transmitter device, wherein the one or more second observations of the second signal transmitted by the second fixed transmitter device are obtained by the second mobile device and comprise one or more second observations of said received signal strength of said second signal or one or more second observations of said time of arrival of said second signal, or a combination thereof;
select at least one of the one or more first observations of said first signal for computing a position fix for said human body based at least in part, on a first indicator, the first indicator being indicative of a utility of the one or more first observations of said first signal relative to a second indicator, the first indicator being based, at least in part, on one or more of the following factors: a degree to which the first mobile device is concealed or obscured from receiving the first signal; a measured first received signal strength; a first measured signal to noise ratio; a first measurement of a presence of multipath; or a first measurement of a presence of signal interference, the second indicator being indicative of a utility of the one or more second observations of said first signal;
select at least one of the one or more second observations of said second signal for computing said position fix for said human body based at least in part, on a third indicator, the third indicator being indicative of a utility of the one or more first observations of said second signal relative to a fourth indicator, the third indicator being based, at least in part, on one or more of the following factors: a second degree to which the first mobile device is concealed or obscured from receiving the first signal; a second measured received signal strength; a second measured signal to noise ratio; a second measurement of a presence of multipath; or a second measurement of a presence of signal interference, the fourth indicator being indicative of a utility of the one or more second observations of said second signal; and combine the selected at least one of the one or more first observations of said first signal and the selected at least one of the one or more second observations of second signal for determining said position fix.

7. The first mobile device of claim 6, wherein said first mobile device comprises a light sensor, and wherein said first indicator is determined based, at least in part, on an output signal from said light sensor.

8. The first mobile device of claim 6, wherein said one or more processors are further configured to:
initiate a scan operation of said first signal transmitted from said first fixed transmitter device; and
determine said first indicator based, at least in part, on measurements obtained based, at least in part, on said scan operation.

9. The first mobile device of claim 6, and wherein said one or more processors are further configured to:
initiate transmission of one or more messages to said second mobile device in response to detection of said presence of said second mobile device; and
obtain one or more response messages received at said transceiver device from said second mobile device indicating a capability to provide observations of signals.

10. A non-transitory storage medium comprising machine-readable instructions stored thereon which are executable by one or more processors of a first mobile device to:
detect a presence of a second mobile device, said first mobile device being located on a first location of a human body and said second mobile device being located on a second location of said human body different from the first location on said human body;
obtain one or more observations of a first signal transmitted by a first fixed transmitter device and acquired at said first mobile device, the one or more first observations of said first signal comprising one or more first observations of a received signal strength of said first signal or one or more first observations of a time of arrival of said first signal, or a combination thereof;
obtain one or more observations of a second signal transmitted from a second fixed transmitter device and acquired at said first mobile device, the one or more first observations of said second signal comprising one or more first observations of a received signal strength of said second signal or one or more first observations of a timing of arrival of said second signal, or a combination thereof;
obtain, from one or more messages received at the first mobile device from the second mobile device through a wireless link between said first mobile device and said second mobile device, one or more second observations of the first signal transmitted from the first fixed transmitter device, wherein the one or more second observations of the first signal transmitted by the first fixed transmitter device are obtained by the second mobile device and comprise one or more second observations of said received signal strength of said first signal or one or more first observations of said time of arrival of said first signal, or a combination thereof, and one or more second observations of the second signal from the second fixed transmitter device, wherein the one or more second observations of the second signal transmitted by the second fixed transmitter device are obtained by the second mobile device and comprise one or more second observations of said received signal strength of said second signal or one or more second observations of said time of arrival of said second signal, or a combination thereof;

select at least one of the one or more first observations of said first signal for computing a position fix for said human body based at least in part, on a first indicator, the first indicator being indicative of a utility of the one or more first observations of said first signal relative to a second indicator, the first indicator being based, at least in part, on one or more of the following factors: a degree to which the first mobile device is concealed or obscured from receiving the first signal; a measured first received signal strength; a first measured signal to noise ratio; a first measurement of a presence of multipath; or a first measurement of a presence of signal interference, the second indicator being indicative of a utility of the one or more second observations of said first signal;

select at least one of the one or more second observations of said second signal for computing said position fix for said human body based at least in part, on a third indicator, the third indicator being indicative of a utility of the one or more first observations of said second signal relative to a fourth indicator, the third indicator being based, at least in part, on one or more of the following factors: a second degree to which the first mobile device is concealed or obscured from receiving the first signal; a second measured received signal strength; a second measured signal to noise ratio; a second measurement of a presence of multipath; or a second measurement of a presence of signal interference, the fourth indicator being indicative of a utility of the one or more second observations of said second signal; and combine the selected at least one of the one or more first observations of said first signal and the selected at least one of the one or more second observations of second signal for determining said position fix.

11. The non-transitory storage medium of claim 10, wherein said first mobile device comprises a light sensor, and wherein said first indicator is determined based, at least in part, on an output signal from said light sensor.

12. The non-transitory storage medium of claim 10, wherein said instructions are further executable by said one or more processors of said first mobile device to:
initiate a scan operation of said first signal transmitted from said first fixed transmitter device; and
determine said first indicator based, at least in part, on measurements obtained based, at least in part, on said scan operation.

13. The non-transitory storage medium of claim 10, and wherein said instructions are further executable by said one or more processors to:
initiate transmission of one or more messages to said second mobile device in response to detection of said presence of said second mobile device; and
obtain one or more response messages received at said first mobile device from said second mobile device indicating a capability to provide observations of signals.

14. An apparatus, at a first mobile device, comprising:
means for detecting a presence of a second mobile device, said first mobile device being adaptable to be located on a first location of a human body and said second mobile device being adaptable to be located second location of said human body different from the first location on said human body;
means for acquiring by said first mobile device a first signal from a first fixed transmitter device to obtain one or more first observations of said first signal, the one or more first observations of said first signal comprising one or more first observations of a received signal strength of said first signal or one or more first observations of a time of arrival of said first signal, or a combination thereof;
means for acquiring by said first mobile device a second signal from a second fixed transmitter device to obtain one or more first observations of said second signal, the one or more first observations of said second signal comprising one or more first observations of a time of arrival of said second signal, or a combination thereof;
means for receiving one or more messages from the second mobile device through a wireless link between said first mobile device and said second mobile device comprising one or more second observations of the first signal transmitted from the first fixed transmitter device, wherein the one or more second observations of the first signal transmitted by the first fixed transmitter device are obtained by the second mobile device and comprising one or more second observations of said received signal strength of said first signal or one or more first observations of said time of arrival of said first signal, or a combination thereof, and one or more second observations of the second signal from the second fixed transmitter device, wherein the one or more second observations of the second signal transmitted by the second fixed transmitter device are obtained by the second mobile device and comprising one or more second observations of said received signal strength of said second signal or one or more second observations of said time of arrival of said second signal, or a combination thereof;
means for selecting at least one of the one or more first observations of said first signal for computing a position fix for said human body based at least in part, on a first indicator, the first indicator being indicative of a utility of the one or more first observations of said first signal relative to a second indicator, the first indicator being based, at least in part, on one or more of the following factors: a degree to which the first mobile device is concealed or obscured from receiving the first signal, a measured first received signal strength, a first measured signal to noise ration, a first measurement of a presence of multipath; or a first measurement of a presence of signal interference, the second indicator being indicative of a utility of the one or more second observations of said first signal;
means for selecting at least one of the one or more second observations of said second signal for computing said position fix for said human body based at least in part, on a third indicator, the third indicator being indicative of a utility of the one or more first observations of said second signal relative to a fourth indicator, the third indicator being based, at least in part, on one or more of the following factors: a second degree to which the first mobile device is concealed or obscured from receiving the first signal; a second measured received signal strength; a second measured signal to noise ratio; a second measurement of a presence of multipath; or a second measurement of a presence of signal interference, the fourth indicator being indicative of a utility of the one or more second observations of said second signal; and
means for combining the selected at least one of the one or more first observations of said first signal and the selected at least one of the one or more second observations of second signal for determining said position fix.

* * * * *